United States Patent
Dooley (10) Patent No.: US 9,202,174 B2
(45) Date of Patent: Dec. 1, 2015

(54) AUTOMATED TRACKER AND ANALYZER

(71) Applicant: Daniel A Dooley, Hull, GA (US)

(72) Inventor: Daniel A Dooley, Hull, GA (US)

(*) Notice: Subject to any disclaimer, the term of this patent is extended or adjusted under 35 U.S.C. 154(b) by 222 days.

(21) Appl. No.: 13/751,320

(22) Filed: Jan. 28, 2013

(65) Prior Publication Data

US 2014/0214740 A1    Jul. 31, 2014

(51) Int. Cl.
*G06F 17/00*  (2006.01)
*G06N 5/02*   (2006.01)
*G06N 5/04*   (2006.01)
*G06N 99/00*  (2010.01)

(52) U.S. Cl.
CPC .. *G06N 5/04* (2013.01); *G06N 5/02* (2013.01); *G06N 99/005* (2013.01)

(58) Field of Classification Search
None
See application file for complete search history.

(56) References Cited

U.S. PATENT DOCUMENTS

| | | | | |
|---|---|---|---|---|
| 6,467,052 | B1* | 10/2002 | Kaler et al. | 714/39 |
| 6,694,362 | B1* | 2/2004 | Secor et al. | 709/223 |
| 7,103,795 | B1* | 9/2006 | Hansen | 714/4.1 |
| 7,529,790 | B1* | 5/2009 | Sayal | 708/422 |
| 2005/0222811 | A1* | 10/2005 | Jakobson et al. | 702/183 |
| 2007/0250525 | A1* | 10/2007 | Sanghvi et al. | 707/102 |

* cited by examiner

*Primary Examiner* — Kakali Chaki
*Assistant Examiner* — Luis Sitiriche
(74) *Attorney, Agent, or Firm* — Smith Risley Tempel Santos LLC; Gregory Scott Smith (57) ABSTRACT

A utility that can be embedded within a system or application, or run as a stand-alone utility, provides a method for identifying causal relationships for one or more events. For instance, if an anomaly is occurring for a subset of events in a series of events, certain information about potential causes can be collected in conjunction with the series of events and, the information can be analyzed to determine if there is a cause and affect relationship leading to the occurrence of the anomalies.

18 Claims, 10 Drawing Sheets

| MOLD ID | LAST USED | QUALITY | CONDITION |
|---|---|---|---|
| TOP-301 | 12/3/2012 | FLAWLESS | GOOD |
| TOP-302 | 12/3/2012 | FAIR | GOOD |
| TOP-303 | 12/3/2012 | FLAWLESS | FLAWLESS |
| TOP-304 | 07/8/2012 | REJECTED | CRACKED |
| SHAFT-423 | 11/4/2012 | REJECTED | JUNKED |
| SHAFT-424 | 11/4/2012 | FLAWLESS | FLAWLESS |
| SHAFT-425 | 11/4/2012 | FLAWLESS | GOOD |
| RHPNL-416 | 12/1/2012 | GOOD | GOOD |
| RHPNL-417 | 12/1/2012 | GOOD | FAIR |
| RHPNL-418 | 12/1/2012 | FAIR | GOOD |
| RHPNL-419 | 1/23/2012 | REJECTED | IN REPAIR |

FIRST PAGE | LAST PAGE | PRV PAGE | NEXT PAGE 310, 312, 314, 316, 320, 322, 324, 326, 328

| | 412 | 414 | 416 | 418 | 420 |
| 410 | | | | | |

HISTORY FOR SHAFT-423

| DATE USED | STRT TIME | STOP TIME | QUALITY | CONDITION |
|---|---|---|---|---|
| 10/2/2012 | 22:04 | 06:00 | FLAWLESS | FLAWLESS |
| 10/5/2012 | 22:14 | 06:05 | FLAWLESS | FLAWLESS |
| 10/7/2012 | 22:06 | 06:04 | FLAWLESS | FLAWLESS |
| 10/9/2012 | 21:54 | 05:57 | FLAWLESS | FLAWLESS |
| 10/10/2012 | 22:00 | 06:01 | GOOD | GOOD |
| 1011/2012 | 22:01 | 06:09 | GOOD | GOOD |
| 10/15/2012 | 22:04 | 06:07 | FAIR | GOOD |
| 10/19/2012 | 22:04 | 06:05 | FAIR | CHIPPED |
| 10/27/2012 | 22:17 | 06:02 | REJECTED | IN REPAIR |
| 11/3/2012 | 22:06 | 06:09 | REJECTED | CRACKED |
| 11/4/2012 | 22:09 | 06:16 | REJECTED | JUNKED |

FIG. 4

| MOLD ID | LAST USED | QUALITY | CONDITION | |
|---|---|---|---|---|
| TOP-301 | 12/3/2012 | FLAWLESS | GOOD | T |
| TOP-302 | 12/3/2012 | FAIR | GOOD | T |
| TOP-303 | 12/3/2012 | FLAWLESS | FLAWLESS | T |
| TOP-304 | 07/8/2012 | REJECTED | CRACKED | T |
| SHAFT-423 | 11/4/2012 | REJECTED | JUNKED | T |
| SHAFT-424 | 11/4/2012 | FLAWLESS | FLAWLESS | T |
| SHAFT-425 | 11/4/2012 | FLAWLESS | GOOD | T |
| RHPNL-416 | 12/1/2012 | GOOD | GOOD | T |
| RHPNL-417 | 12/1/2012 | GOOD | FAIR | T |
| RHPNL-418 | 12/1/2012 | FAIR | GOOD | T |
| RHPNL-419 | 1/23/2012 | REJECTED | IN REPAIR | T |
| FRST PAGE | LAST PAGE | PRV PAGE | NEXT PAGE | |

| TRACKER DEFINITION | | |
|---|---|---|
| NAME | FORMAT | DESCRIPTION |

| ENTER DEFINITIONS FOR TRACKER | | |
|---|---|---|
| TEMP | ###.## | Local temperature during curing hours |
| HUMIDITY | ###.## | Local humidity during curing hours |

| ENTER DATA | | |
|---|---|---|
| TEMP | 52 | Local temperature during curing hours |
| HUMIDITY | 85% | Local humidity during curing hours |

TRACKER RULES

Select parameters that rule applies to

| | |
|---|---|
| ▒ | ALL USERS 1010 |
| ☐ | SELECT USERS 1012 |
| ■ | ALL MOLDS 1014 |
| ☐ | SELECT MOLDS 1016 |
| ☐ | SELECT FREQUENCY 1018 |

AUTOMATED TRACKER AND ANALYZER

CROSS-REFERENCE TO RELATED APPLICATIONS

This is a utility patent application being filed in the United States as a non-provisional application for patent under Title 35 U.S.C. §100 et seq. and 37 C.F.R. §1.53(b) and, is a continuation-in-part of the U.S. patent application Ser. No. 13/560,528 that was filed on Jul. 27, 2012, which application is incorporated herein by reference in its entirety.

BACKGROUND

Chaos theory studies the behavior of dynamical systems that are highly sensitive to initial conditions. Although this is a mouthful and a little hard to grasp on first read, it is much more readily understood when this is referred to by it more popular name—the butterfly effect. Briefly, the butterfly effect poses that small differences in initial conditions (such as those due to rounding errors in numerical computation) yield widely diverging outcomes for such dynamical systems, rendering long-term prediction impossible in general. The name of the effect, coined by Edward Lorenz, is derived from the theoretical example of a hurricane's formation being contingent on whether or not a distant butterfly had flapped its wings several weeks before. Although the butterfly effect may appear to be an esoteric and unlikely behavior, it is exhibited by very simple systems: for example, a ball placed at the crest of a hill may roll into any of several valleys depending on, among other things, slight differences in initial position.

In many scenarios, it can be rather important to identify and correlate causes and effects. One can appreciate that such capabilities would have great use and advantage in any of a wide variety of settings such as, production, healthcare, productivity, athletics, stock prices, etc., as a few non-limiting examples. Thus, being able to identify a nexus between causes and effects in several such scenarios, and then being able to take action based on this information, could be the difference between (a) producing products that avoid or result in a product liability law suit, (b) life or death of a patient, (c) meeting or blowing through a deadline due to productivity, (d) winning or losing the SUPER BOWL or (e) a rise or fall in a companies stock price.

However, as clearly seen by the butterfly effect example, the multitude of causes and the multitude of effects can create an infinite list of items that need to be tracked, observed and analyzed. In addition, in many situations the ability to draw a connection between the cause and effect may be difficult, impossible or at least unverifiable, which simply leads to speculation. However, rather than having absolute certainty with regards to causes and effects, there is at least a benefit that can be derived from assigning probabilities to various causes and effects.

Thus, there is a need in the art for a solution that can help track various causes and effects and to identify some level of probability with regards to the nexus of certain causes and effects. In our electronic and connected world, much automation can be implemented to provide assistance in the tracking and analysis of causes and effects.

BRIEF SUMMARY

The present disclosure presents a novel technique for the provision of a tracker utility that can be utilized to identify and track data that may be correlated with specific events and, thus to help identify a cause and effect relationship. In general, the tracker utility allows for the definition of data records to be collected, and to collect and associate that data with certain events. In some embodiments, the data definition, collection and recordation are manual processes performed by users. In other embodiments the definition, collection and recordation are automated processes that do not require user intervention. In yet other embodiments, a blend of manual and automated operations may be included.

The tracker utility may be included in any of a variety of settings and/or environments and be implemented in a variety of manners. And although the general functions and operations of the tracker utility are considered novel, some of the various nuances and implementation details, in and of themselves, are also considered to be novel. In one particular embodiment, the tracker utility includes tasks that track something specific, such as temperature, time, events, etc., or in some embodiments, may track multiple items. Each task within the tracker utility may represent a discrete item of data that may be collected and is typically associated with an event (i.e., a sale, an uncovered defect, a delivery delay, a production increase, etc. as non-limiting examples).

The tracker utility, whether embedded within a system or application, or running as a stand-alone utility, provides a method for identifying causal relationships for one or more events. For instance, if an anomaly is occurring for a subset of events in a series of events, certain information about potential causes can be collected in conjunction with the series of events and, the information can be analyzed to determine if there is a cause and affect relationship leading to the occurrence of the anomalies.

In general, embodiments of the tracker utility operate to collect/receive data that is or may be related to certain events in a series of events. A goal of the tracker utility is to provide a mechanism in which a causal relationship pertaining to an event, or multiple events may be discovered. As such, for a series of events, a definition is created with regards to data that is to be collected. There may or may not be a known causal relationship between the event and the data. For instance, the data can be randomly selected, selected based on a suspicion or collected because of some evidence of a causal relationship. For certain events in the series of events, data is collected from one or more sources and then stored along with information pertaining to the event. Over time, this data can be analyzed along with the events to determine is there is a cause and affect relationship.

These embodiments, features and aspects are further described in the following detailed description and the figures.

DETAILED DESCRIPTION OF EMBODIMENTS OF THE INVENTION

This description is related to and is directed towards a tracker utility that can be incorporated into a variety of systems to enable the collection, recordation and analysis of data related to a particular process, item, event, etc. (collectively and individually referred to within this description as an event). Although various aspects, features and embodiments of the tracker utility are presented within this description in specific embodiments and environments, such as a web-based or web-centric accounting and general ledger system, it will be appreciated that such environments are only non-limiting examples of an environments that is suitable for various embodiments, configurations and implementations of the tracker utility.

At a very high level, the tracker utility, or the tracker, is a utility that can be included in a variety of settings to allow a user to identify and insert data for an event, allow management or others to require or solicit the collection and input of data for an event and/or causing automated process to search for, identify and collect data for an event. In addition, in some embodiments that tracker may be a stand-alone application, such as an app for a smart phone, tablet computer, computer, etc. The data collected can then be used to guide the event, augment other activities to cause different results, and/or learn more information about the event or issues related to the event. The various embodiments of the tracker include three dimensions: (1) identification of an event that should be tracked; (2) implementation of various levels of data accumulation and tracking related to the event; and (3) analysis of the collected information to make informed judgments. Turning now to the drawings in which like elements are represented by similar labels, further details, features and embodiments of the tracker utility are provided.

Figure 1:
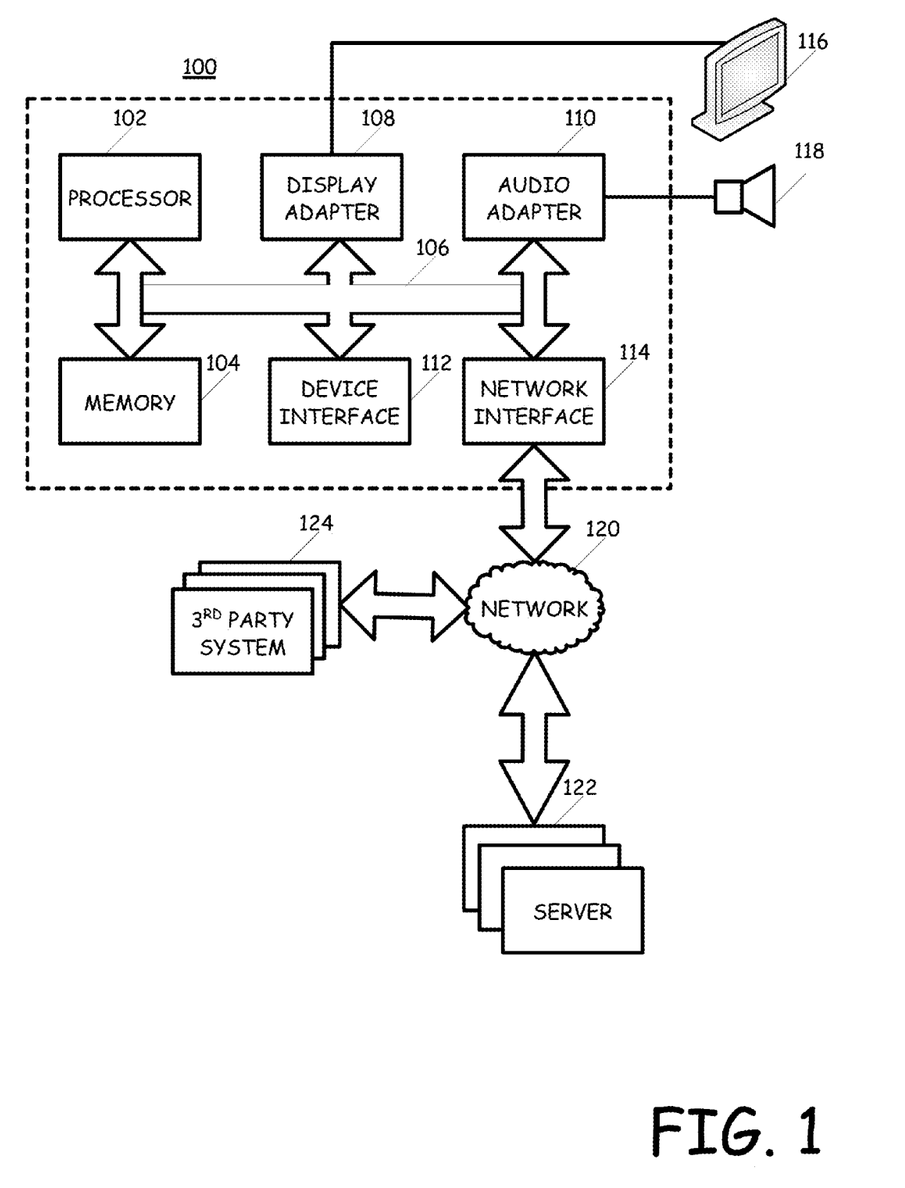
FIG. 1 is a functional block diagram of the components of an exemplary environment or platform in which the tracker can be implemented or an application, module or routine utilizing the tracker can be implemented.

FIG. 1 is a functional block diagram of the components of an exemplary environment or platform in which the tracker can be implemented or an application, module or routine utilizing the tracker can be implemented. It will be appreciated that not all of the components illustrated in FIG. 1 are required in all embodiments or implementations of the tracker but, each of the components are presented and described in conjunction with FIG. 1 to provide a complete and overall understanding of the components. In addition, it will be appreciated that the tracker may be implemented in systems and/or environments that may include other components and functionality and as such, the illustrated configuration is simply a non-limiting example.

The exemplary platform 100 is illustrated as including a processor 102 and a memory element 104. In some embodiments the processor 102 and the memory element 104 may be communicatively coupled over a bus or similar interface 206. In other embodiments the processor and the memory element 104 may be fully or partially integrated with each other. The processor 102 can be a variety of processor types including microprocessors, micro-controllers, programmable arrays, custom IC's etc. and may also include single or multiple processors with or without accelerators or the like. The memory element of 104 may include a variety of structures, including but not limited to RAM, ROM, magnetic media, optical media, bubble memory, FLASH memory, EPROM, EEPROM, etc. In addition, rather than being internal to the platform 100, the memory element 104 may be external to the platform 100 and accessed through a device interface 112 or network interface 114. The processor 102, or other components may also provide sub-components or functionality such as a real-time clock, analog to digital convertor, digital to analog convertor, sensors, etc. The processor 102 also interfaces to a variety of elements including a control/device interface 112, a display adapter 108, audio adapter 110 and a network/device interface 114. The control/device interface 112 provides an interface to external devices, systems, equipment, sensor, actuators or the like. As non-limiting examples, the control/device interface 112 can be used to interface with devices or systems such as a keyboard, a mouse, a pin pad, and audio activate device, a PS3 or other game controller, as well as a variety of the many other available input and output devices or, another computer or processing device. The display adapter 108 can be used to drive a variety of visually oriented alert elements 116, such as display devices including an LED display, LCD display, one or more LEDs or other display devices. The audio adapter 110 interfaces to and drives a variety of audible or other alert elements 118, such as a speaker, a speaker system, buzzer, bell, vibrator, etc. The network/device interface 114 can also be used to interface the computing platform 100 to other devices or systems through a network 120. The network may be a local network, a wide area network, wireless network (WIFI, Bluetooth, cellular, 3G, etc.), a global network such as the Internet, or any of a variety of other configurations including hybrids, etc. The network/device interface 114 may be a wired interface or a wireless interface. The computing platform 100 is shown as interfacing to a server 122 and a third party system 124 through the network 120. Thus, the computing platform can function independently, in connection with one or more systems, or even as a distributed system. A battery or power source provides power for the computing platform 100.

Figure 2:
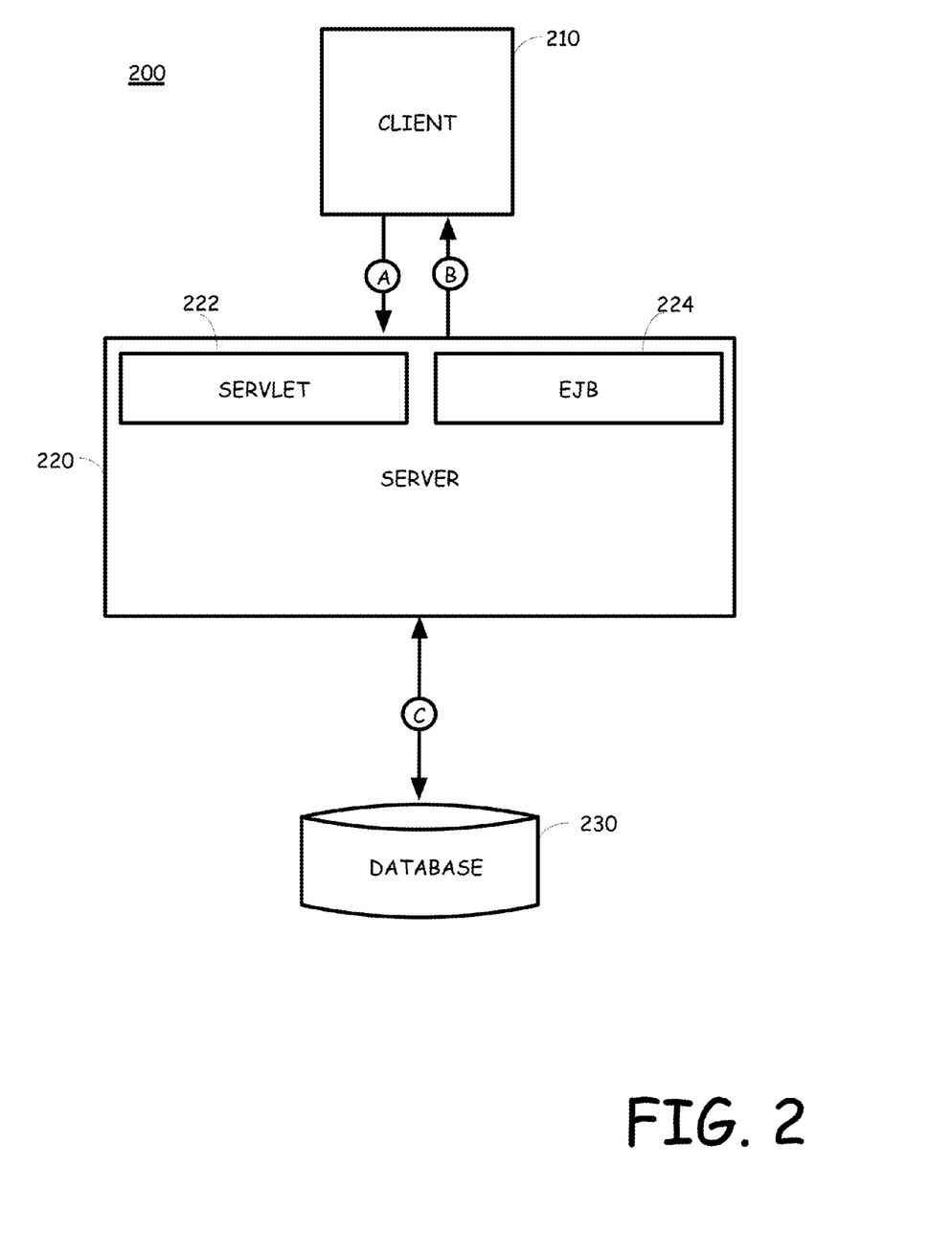
FIG. 2 is a non-limiting example of an environment in which the tracker can be implemented.

FIG. 2 is a non-limiting example of an environment in which the tracker can be implemented. The environment illustrated in FIG. 2 is a client-server application environment 200. The client-server application environment is shown as including, but not limited to, the components of an application client 210, a server 220 and a database 230. The application client 210 communicates information to the server 220 over communication path A and receives communicated information from the server 220 over communication path B. A protocol such as HTTPS may be used to provide data privacy for information that is communicated between the application client 210 and the server 220 and enforces client authentication to limit access to the server 220 to authorized users. It will be appreciated by one of ordinary skill in the relevant art that the tracker could be incorporated into any local or distributed computing environment and the illustrated example is just provided for purposes of explanation.

It will be appreciated that the computing platform 200 illustrated in FIG. 2, may then provide an environment on which an application, program, system, etc. can run, and that such application, program, system, etc., may incorporate aspects of the tracker utility or access an external function or system that houses the tracker utility. Likewise, the computing platform 100 may also illustrate a platform in which a standalone embodiment of the tracker utility may reside, such as a smart phone, tablet computer, lap top computer, desktop computer, etc.

In the various embodiments, the tracker utility enables the identification, capture and recordation of data that would not otherwise be captured by a system or application. It should be appreciated that the tracker utility can be used for any of a variety of purposes, such as process improvement, business activities, etc. In essence, any event that may have a cause and effect relationship based on other actions or activities could benefit from the use of the tracker utility.

The tracker may be viewed as providing a multi-level approach to the collection of data: (a) user defined level; (b) attributes level; and (c) market defined data level. It will be appreciated that these levels are presented as an exemplary way to view the operation of the tracker but, other views with more or fewer levels could also be described and, the operations of the tracker could be presented independent of the level view. But, for purposes of illustration, the tracker utility is described in accordance with these three levels.

The user defined level includes an interface that enables a user of an application, program or process that includes the tracker utility, or a user of a standalone tracker utility, to record data related to an event. As previously noted, the term event is used to generically refer to any type of information, process, action, event, etc., that is being tracked, monitored, analyzed, etc. For instance, within the environment of a general accounting system, as will be described in more detail below, the event may be a transaction record, such as a purchase of supplies, the reception of an order, the delivery of product, etc. At the user defined level, the user can spontaneously enter data that is relevant to the event. For instance, the data may simply include the time of day associated with the event. In other embodiments, the data may include the weather, the time, the day of the week, the temperature, the level of humidity, a current value for an exchange index such as the NEW YORK STOCK EXCHANGE, other current events, etc. The user defined level in essence is a preliminary step in the data collection process. A typical example is that the user happens to take note of a certain characteristic at the time of the event and, not maybe not fully understanding the relevance, importance, etc. decides to record data associated with the event. This is performed based on a decision by the user as opposed to an automated function.

In operation, an application, program or system that embodies the tracker utility will include a user interface to allow the user to enter such data. The user interface to access the tracker utility may be persistent or may require an action on the part of the user to invoke, such as a pull down menu, icon on a function bar, etc. As one non-limiting example, if the tracker utility is embodied within a spreadsheet environment, the user could select a particular cell and then actuate the tracker utility to enter data related to the highlighted cell. Upon being actuated, a window may be presented to the user, or some other interface may be used, to allow the user to identify the type of data being entered, the source of the data, the actual data, etc.

The next level of the tracker utility is referred to as the attributes level. The attributes level is an escalation of the user defined level in that an additional force, other than the user is imposing requirements for data collecting with regard to the event. As a non-limiting example, the user's management team may determine that data should be collected on a larger scale (i.e. more users, collecting the data with regards to the event rather than just one independent user or, similar data should be collected with regards to similar or related events, etc.). As a result, rather than the data being entered by a user operating on his or her own accord, the data collection can be refined and expanded to include other users. Thus, as users of an application, program, etc., record an event, the tracker utility may automatically be invoked to require the users of the application, or a subset thereof, to obtain and enter the requested data pertaining to the event.

The third level in the described embodiment is the market defined data level. The market defined data level is an escalation of the attributes level. Generally the market defined data level is invoked when it is determined that data should be collected from outside sources or devices and that the data should be consistently and automatically collected. The market defined data level thus includes an interface to allow the data collection to be automated. Such an interface may receive directions such as the identification of sources for required data and how to access those sources and how to retrieve the desired data, the timing, frequency and intensity of the data collection, the verification of the collected data, etc.

The following example is a non-limiting example of a particular application of the tracker utility and is provided to assist in an overall understanding of an exemplary embodiment of the tracker utility. It should be appreciated that while certain aspects, functions and configurations presented in this example are considered novel, other embodiments of the tracker utility are not limited to such aspects, functions and configurations. In the example, it is assumed that employees of a small shop are using the presented embodiment of the tracker utility and that the small shop manufactures custom ceramic sinks. In this hypothetical example, it is also assumed that the company is having a problem with mold breakage. It has been discovered that on some occasions, during the overnight curing period, a significant number of the molds crack or break. The broken molds result in significant losses and expenses for the company in that it increases costs for materials, labor, and the adversely effects the production schedule. The mold breakage appears to occur intermittently, making it difficult for the management to determine the actual cause. One of the employees at the company wonders if there is a connection between the broken molds and the weather, after noticing that the molds seem to be breaking more often in cool and humid or rainy conditions. The company uses software to monitor various aspects of production, such as the age and condition of the molds used in a given production run. However, the employee discovers the software cannot record additional data outside of its preconfigured settings. The tracker function provides the means to capture data "on the fly" for almost any conceivable variable a company might want to track, for as long as the company wants to track it. The following paragraphs describe the interaction between the tracker function and existing software.

Figure 3:
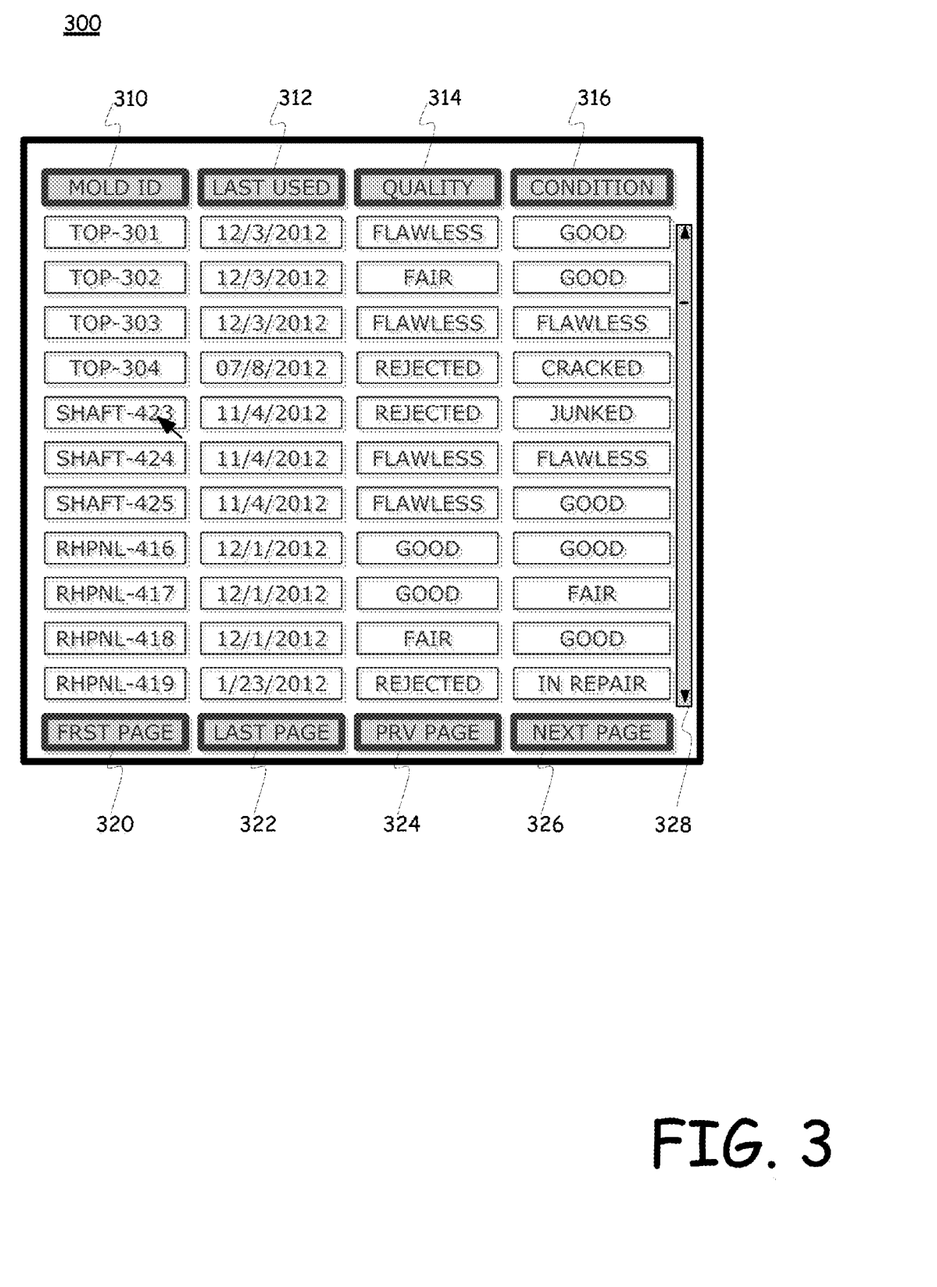
FIG. 3 is a screen shot from an exemplary status program that the company utilizes to keep track of production.

FIG. 3 is a screen shot from an exemplary status program that the company utilizes to keep track of production. For each of the molds, the status program includes the mold identification 310, the date that the mold was used for this current report 312, the production quality of the resulting product (Flawless, Good, Fair, Rejected) 314 and the condition of the mold (Flawless, Good, Fair, In Repair, Cracked, Chipped, Scratched, Junked) 316. At the end of a production cycle, the status program allows a technician to record the date that a particular mold was used, the quality of the product produced and the current condition of the mold. The status program presents a screen 300 that presents a list of the molds and the latest status for the mold. If more molds are in production than the screen can hold, the user can scroll to different pages by selection one of the navigation buttons on the bottom of the screen (FRST PAGE 320, LAST PAGE 322, PRV PAGE 324 and NEXT PAGE 326) or by using the scroll bar 328. By selecting a particular mold ID, the status program switches over to a detailed view of the history for that particular mold.

Figure 4:
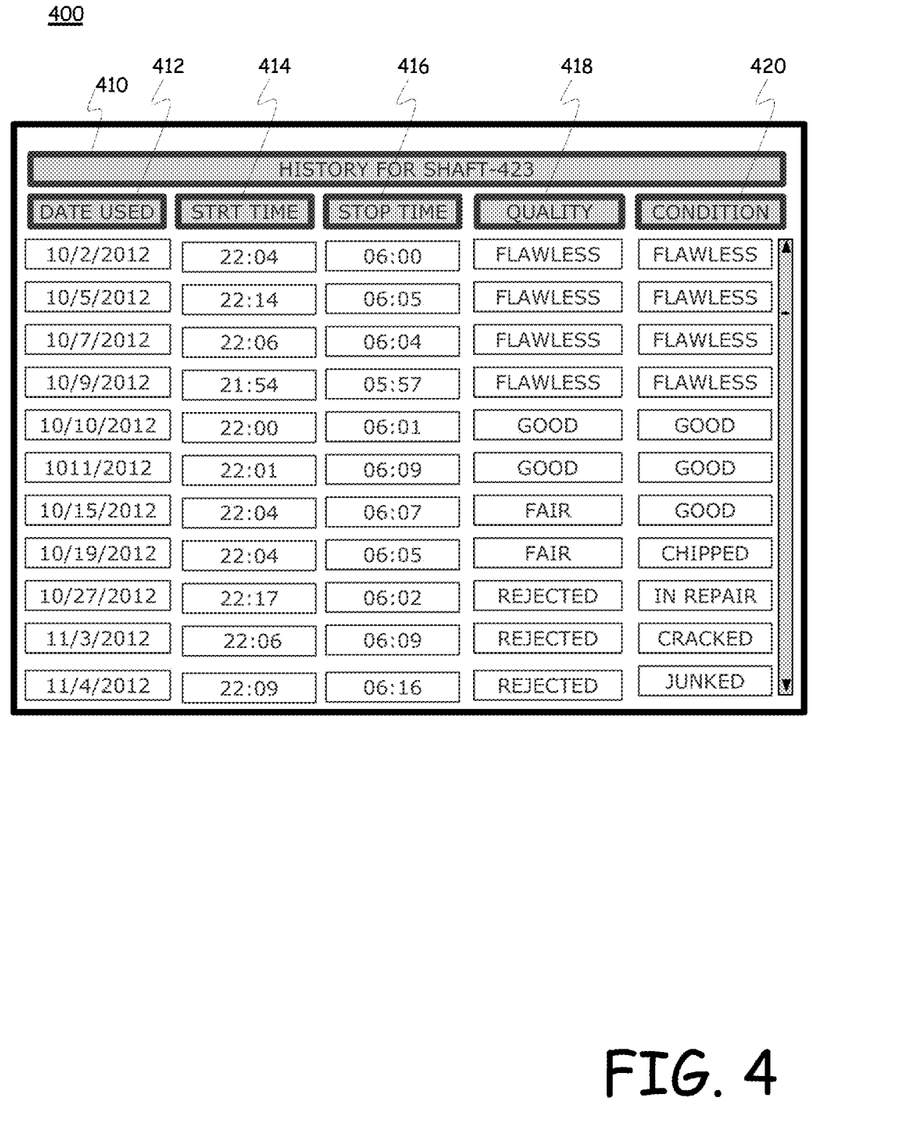
FIG. 4 is an exemplary screen shot illustrating the detailed history for a particular mold that has been actuated-shaft-423.

FIG. 4 is an exemplary screen shot illustrating the detailed history for a particular mold that has been actuated-shaft-423. On the top of the screen 400, the screen title 410 shows that this is a history report for shaft-423 mold. The history table includes a column to identify the dates of use of the mold 412, the time the mold was put into use 414, the time when the mold was removed from use 416, the quality of the product produced (Flawless, Good, Fair, Rejected) 418 and the condition of the mold (Flawless, Good, Fair, In Repair, Cracked, Chipped, Scratched, Junked) 420. Thus, it can be appreciated that using the exemplary status system, the user can keep track of each mold, gain a view of the current status of the molds as in FIG. 3 or look at the history of any particular mold FIG. 4. However, what is not available is the ability to identify information to track with regards to the usage of the mold.

Figure 5:
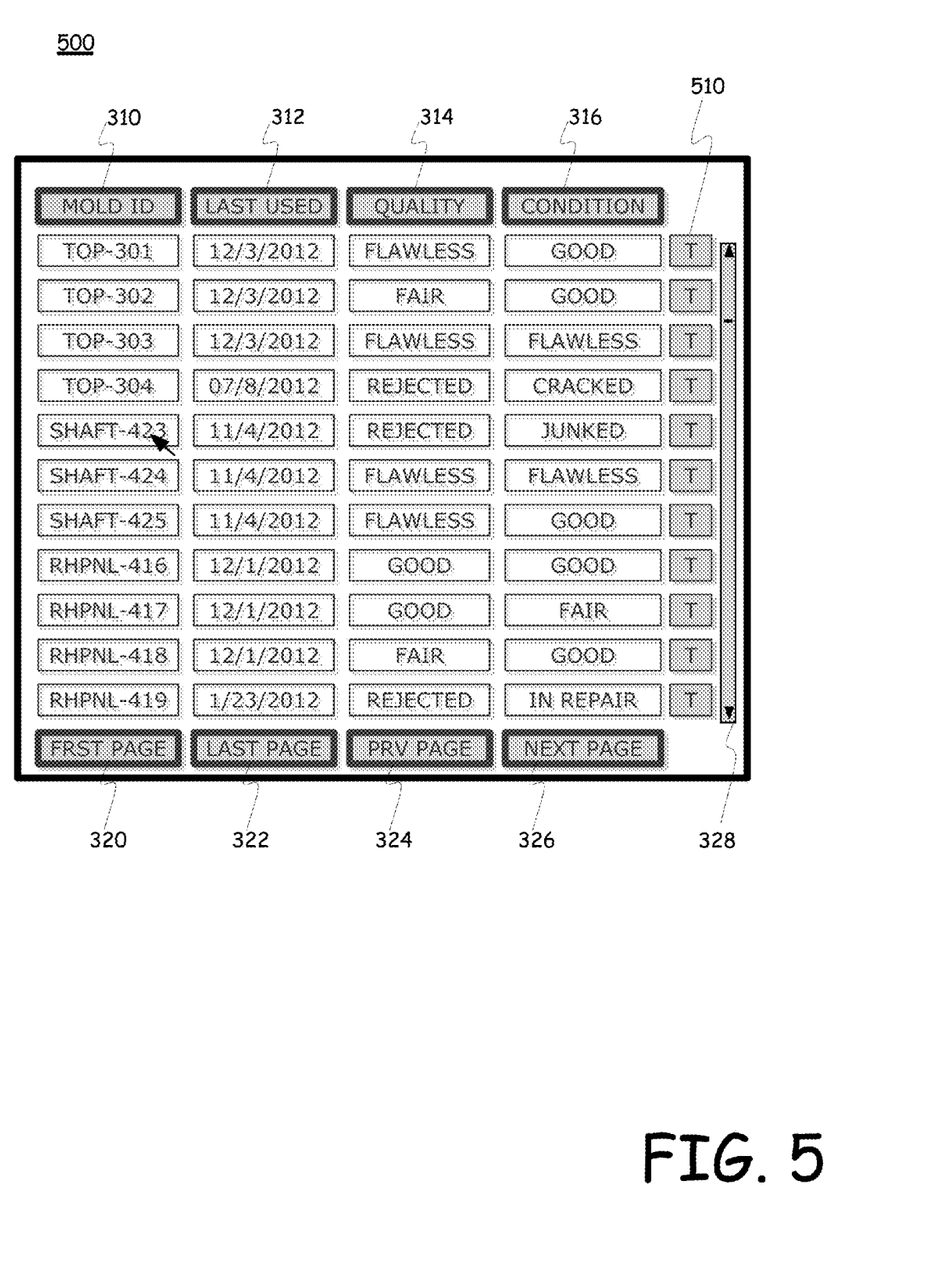
FIG. 5 is a screen shot from the exemplary status program as shown in FIG. 3 with the addition of the tracker utility.

FIG. 5 is a screen shot from the exemplary status program as shown in FIG. 3 with the addition of the tracker utility. As previously mentioned, the tracker utility may be a stand alone program, application (such as a smart phone app) or may be integrated into any of a variety of other programs, systems, etc. In the illustrated embodiment, the tracker system is integrated into the status program. A user of the tracker system can access the tracker utility by actuating the tracker button 510 next to the data entry for a particular mold.

With the tracker utility equipped status program, the user may, on his or her own initiative, use the tracker utility as a first level of data collection (user defined level) to begin the recordation of data with regards to an event related to a particular mold. When the use enters the status information for a mold, the user simply actuates the tracker button 510 to pull up a window, screen, dialog or some other form of user interface to allow the user to either define the data to be entered or, to enter data that satisfies the definition requirement.

Figure 6:
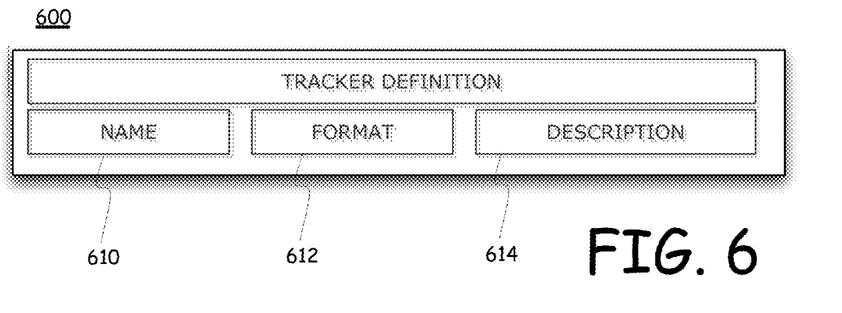
FIG. 6 is an exemplary screen illustrating a conceptual user interface for defining data to be tracked for a particular event.

FIG. 6 is an exemplary screen illustrating a conceptual user interface for defining data to be tracked for a particular event. The interface 600 includes a field to define a name for the data 610, the format in which the data is to be entered 612 and a description of the data 614. It should be appreciated that a variety of rules may also be created as enforcement with regards to the data entry. For instance, ranges can be defined, accepted values and rejected values can be defined, etc. Other fields may also be included such as identifying the source of the information, identifying the accuracy of the information, identifying the time that the data was collected, the date the information was collected, whether the data was cross-correlated with other sources and if so how many and what was the average, mean and/or standard deviation between the sources, etc.

Figure 7:
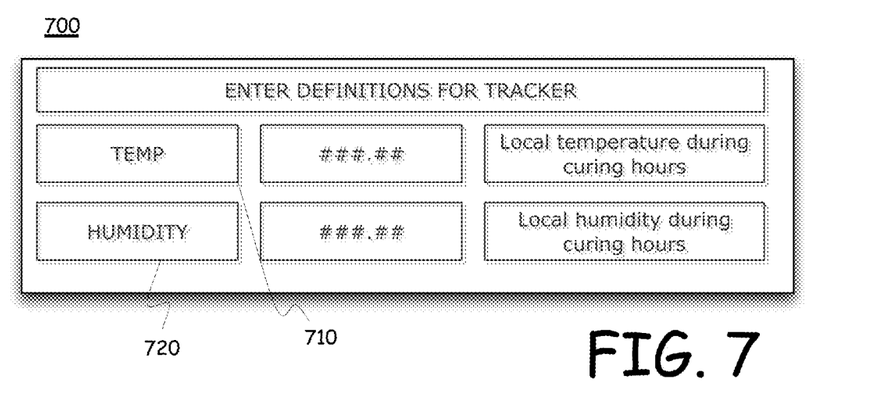
FIG. 7 is an exemplary screen for a data definition that is applicable to the current example.

FIG. 7 is an exemplary screen for a data definition that is applicable to the current example. For the illustrated embodiment, the user has created two data fields, one for the temperature 710 and one for the humidity 720. The temperature data field is called TEMP, and the definition identifies the format for the data entry and provides a description of the data. The humidity data field 720 is called HUMIDITY and likewise identifies a form for the data entry and provides a description of the data. Once the data fields are defined, when the user actuates the tracker utility button 510, the user may be prompted to define a data field, redefine a data field or to enter data. If the user selects to enter data, an interface is presented to the user for entering the data.

Figure 8:
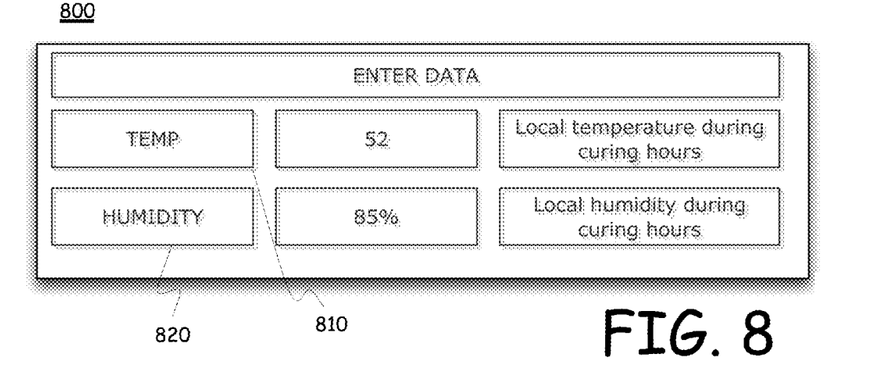
FIG. 8 is an exemplary screen shot for an interface to allow a user to enter data related to a particular event or object, such as a mold in the present example.

FIG. 8 is an exemplary screen shot for an interface to allow a user to enter data related to a particular event or object, such as a mold in the present example. In the illustrated example, the user has entered the temperature of 52 degrees and the humidity value of 85%. Once entered, this information becomes part of the history of the mold being evaluated and thus, can be searched on, reviewed and analyzed with regards to the condition of the mold.

At this level of operation, the user records the temperature and humidity from a user selected or identified data source (i.e., the source could be a website such as weather.com, a radio or television broadcast, instrumentation, etc.). Whatever the source of the data, the user obtains the data and manually enters the data in conjunction with the recordation of the event. Thus, in some embodiments, the tracker utility may include the ability to tack such data to any particular event or various events recorded in the system but in other embodiments, the user may be required to define or create a special field in a transaction screen or otherwise record the data and associate it with the event.

In the example being presented, suppose that after a few weeks of recording the data, the data collected by the employee tends to confirm his or her initial suspicion—mold breakage appears to be more frequent and/or severe on days in which the temperature is cooler and the humidity is high. The employee then presents his or her findings to the supervisor. In this particular example, the supervisor may conclude that the theory is worth being monitored more closely and thus, can impose a requirement on all shifts to begin collecting and recording data about the temperature and humidity along with mold status/evaluation events. The supervisor utilizes the attributes level to expand the data collection to more users, and as a result, is able to monitor the data collected.

Figure 9:
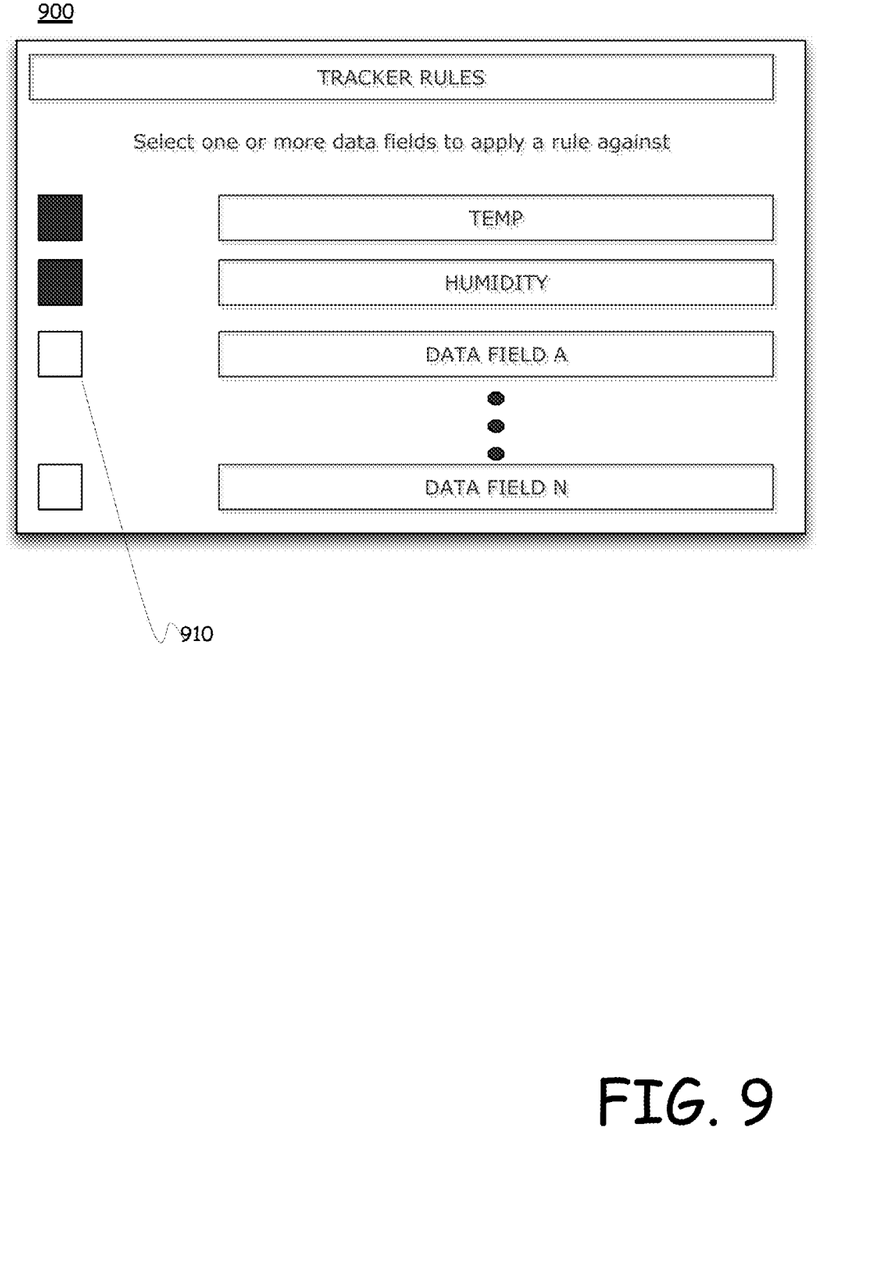
FIG. 9 is an exemplary screen shot for a supervisor interface operating at the attributes level to expand the data collection.

FIG. 9 is an exemplary screen shot for a supervisor interface operating at the attributes level to expand the data collection. In screen 900 the supervisor is first prompted to select one or more of the tracker data fields for which to create a tracker rule. The user simply selects the check box next to the data field name to select it. In the illustrated example, the supervisor has selected the TEMP and HUMIDITY data fields for the rule.

Figure 10:
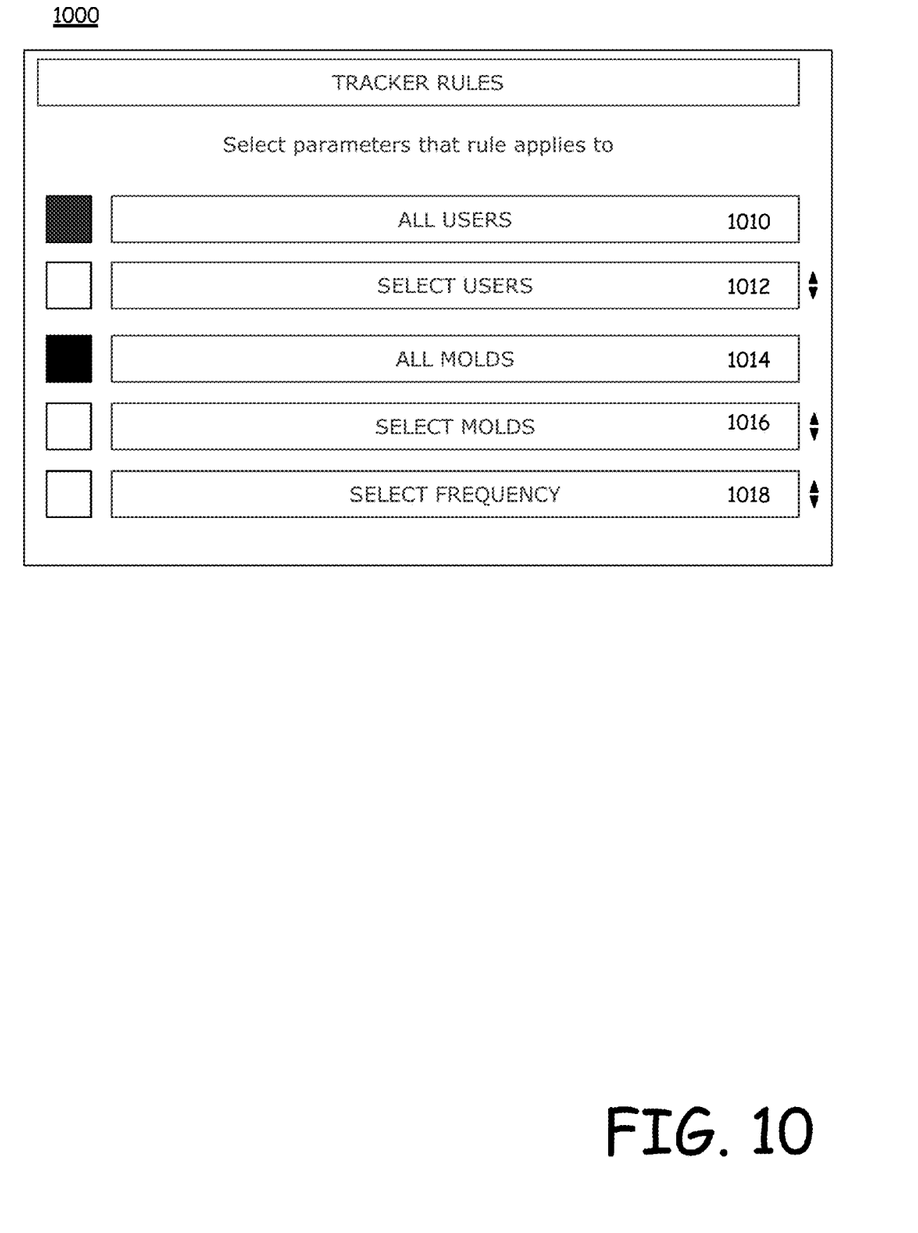
FIG. 10 is an exemplary screen shot for defining the application of the rule(s) based on various parameters.

FIG. 10 is an exemplary screen shot for defining the application of the rule(s) based on various parameters. In the illustrated non-limiting example, an ALL USERS box 1010 is provided to allow the rule to be applied to all users of the system. Alternatively or in addition, a SELECT USERS box 1012 may be provided to allow the supervisor to select one or more of any of the listed users. Check boxes may be utilized, as well as certain format attributes to show that the particular users have been selected.

Similarly, the rule can be applied against all molds by actuating the selection box next to the ALL MOLDS button 1014 or one or more individual molds can be selected for the application of the rule.

In addition, the non-limiting example also shows the SELECT FREQUENCY parameter entry 1018 which allows the supervisor to decide when, and how often the data is to be collected. Thus, the users may be required to gather and enter the data once every other use of the mold, once a week, twice a day, etc.

It will be appreciated that a wide variety of other parameters may also be used and the various embodiments of the tracker utility anticipate such other parameters and thus the examples provided herein are non-limiting. Other non-limiting and non-illustrated parameters may include groups or classes of people, shifts, geographical locations, classes of products, etc.

In the illustrated example, the supervisor has selected the rule to be applied against all users and all molds.

Once the rules have been defined, then in operation the data can be more easily and reliably collected. For instance, as a non-limiting example, after a user enters status information with regards to a particular event, the user may be forced to enter the tracker information before moving on to the next screen or action. A dialog or user interface may pop up on the screen prompting the user to take the necessary action, such as visiting a particular content source to gather applicable data. Some embodiments may provide an override button but other embodiments will require the data to be entered before moving forward.

Continuing with the present example, suppose that after a period of time of collecting the data and analyzing the data, the supervisor realizes that the majority of the temperature and humidity readings are being collected from the website of the local airport. Upon conducting further research, the supervisor determines that these temperature readings are only updated periodically through the day and are not updated at all between the hours of 8 pm to 8 am. As such, any fluctuations in the temperature and humidity that would occur during these timeframes, which is the time frame that the kilns typically run, were not being accurately recorded. The supervisor then decides to install probes in the shop for measuring temperature and humidity.

The supervisor may also impose the collection of data at the market defined data level. At this level, in the present example, the supervisor is able to enforce the recordation of temperature and humidity readings at specific times, under specific conditions and in an automated manner. For the market level, similar to the attributes level, the supervisor may be presented with a screen similar to the one illustrated in FIG. 9, which allows for the selection of data fields. Alternatively, the supervisor may be presented with a list of rules that have already been defined as well as the ability to define a new rule following in the steps of the attributes level.

At the market defined data level, the automation and consistency is added into the process and the user interaction is limited, reduced or eliminated all together.

Using the data collected with the tracker utility, the company was able to identify the range of temperature and humidity in which mold breakage was most likely to occur and then implement preventive measures when needed to alleviate the breakage issue. Advantageously, adjustments could then be made to greatly limit the number of mold breakages and productivity and profitability can be realized.

Figure 11:
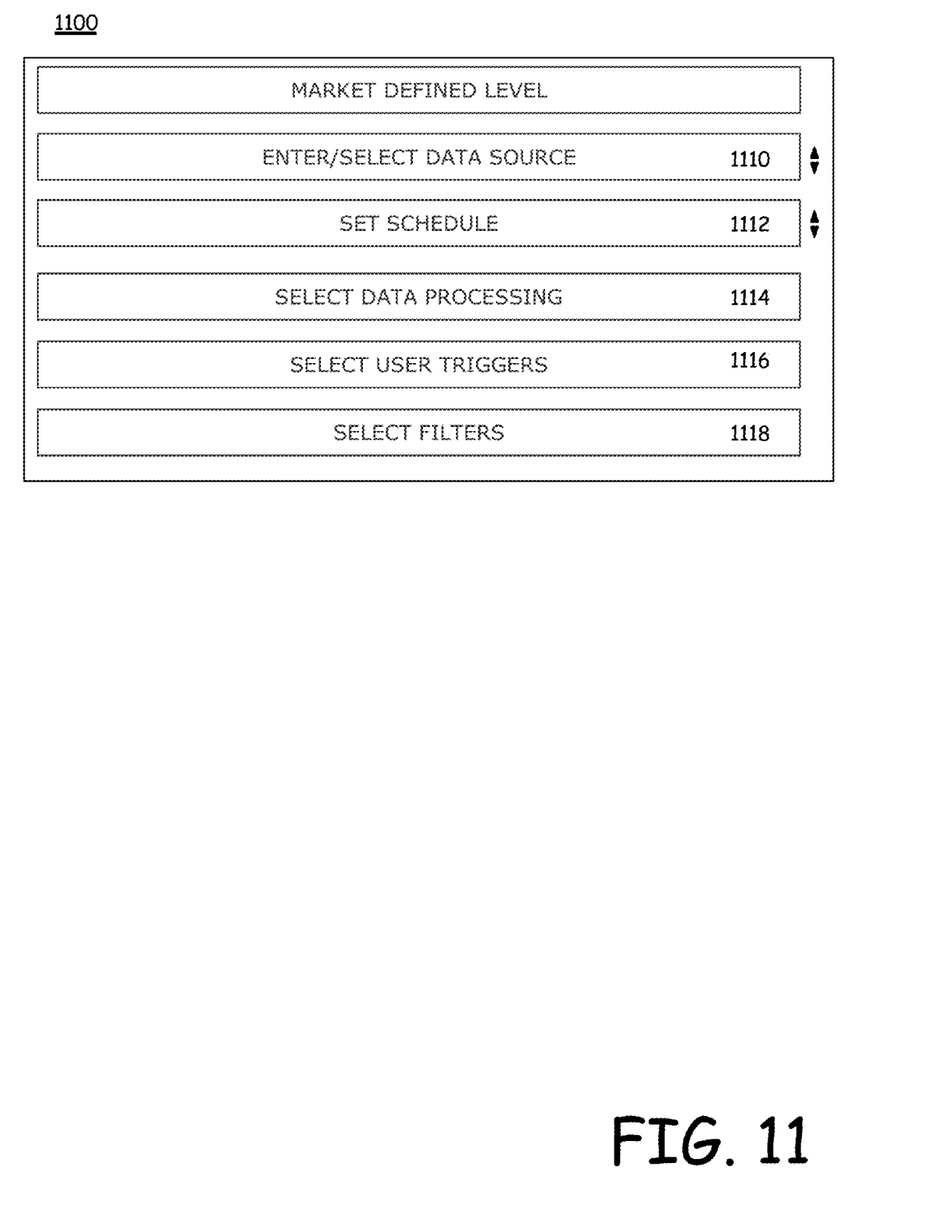
FIG. 11 is an exemplary screen showing non-limiting examples of controls that can be imposed on the rules or the data collection at the market defined level.

FIG. 11 is an exemplary screen showing non-limiting examples of controls that can be imposed on the rules or the data collection at the market defined level. It will be appreciated that additional or alternative controls could be utilized in various embodiments, as well as variations of the controls described herein. One of the illustrated controls allows the user to enter or select a data source 1110. The data source is selected as the one or more sources from which the system will pull the data. For instance, if the tracker utility is to collect temperature, the user may be presented with a list of websites or sources for receiving the temperature readings. In addition or alternatively, the user may be allowed to define and enter a custom source. The sources may include websites, local instrumentation, phone accessible data, or any of a variety of other sources. In addition, in some embodiments multiple sources may be selected and data can be collected from each of the sources and compared for data integrity.

Although the market defined level of data collection typically runs automatically without user intervention, it should be appreciated that in some embodiments, the tracker utility may prompt the user to gather and enter the data rather than automatically collecting it. In other embodiments both types of operations may be optionally enabled.

Another control may be utilized to set the schedule the data collection, assimilation, analysis and recordation 1112. For instance, in an exemplary embodiment the user may be able to select a schedule for collecting data samples but to set a different schedule for analyzing the data, such as calculating a mean value or average value, and then a schedule for recording the analyzed data. In other embodiments, the user may simply identify a single schedule for collecting and recording the data. The schedule can be set up to select particular days, intervals, or even aperiodic points on the calendar. In addition, the schedule can identify the time or time ranges in which the data is to be collected. The schedule may include a combination of dates and times or, simply dates or times. Once the schedule is set, the tracker utility may then autonomously run, collect, analyze and record the data in accordance with the settings. As previously mentioned, in some embodiments user intervention may also be included to request the user to verify or validate data or to prompt the user to collect and enter the data rather than automatically accessing the source or for sources for which the tracker utility may not have direct access.

Another control in some embodiments allows the user to select data processing for the collected data 1114. The data processing can include a variety of functions and a few non-limiting examples include: calculating statistics related to the data, such as averages, means, standard deviations, etc.; validating data by various means by comparing to expected values, historically related values, etc.; establishing ranges of valid data; setting a minimum sample requirement for data samples, such as X samples or samples from Y sources; etc.

In various embodiments, the users can select user triggers 1116. The user triggers can run along with or in lieu of the data collection schedule. The user triggers define actions in the underlying system or process that trigger the collection and/or recordation of data. For instance, events that may occur at different times in a system or process do not lend themselves to a fixed schedule for data collection. Thus, rather than the schedule, the events themself may trigger the collection and/or recordation of the data. In the present example, an event may include the removal of the mold from the kiln or, the turning off of the kiln. Similarly, an event may include the turning on of the kiln or the placement of the mold within the kiln. Further, the turning on and off of the kiln may be events that bookmark the beginning and ending of a data collection period and the data collections may run in accordance with a set schedule during the data collection period.

Another option is to create or select filters for the application of the tracker utility functions 1118. As such, the collection and/or recordation of the data can be filtered based on users, products/processes, etc.

When a filtered task is created, the filters can be used to associate the task with the desired module/screen/user combination. As a non-limiting example, if an administrator wants receiving clerks to track how many shipments arrive at their dock containing broken items, he or she can create that task and then assign it to the IN Shipment Entry screen of an in-processing system and to specific users (i.e., receiving clerks). An administrator can make the task required in order to save a given record. Thus, for such a receiving clerk to save a record reporting the reception of inventory, the task is invoked thereby requiring the clerk to enter the required data.

As a visual indicator, the tracker button may look different on different screens to indicate different functionality—such as to differentiate between required actions and recommended actions.

Embodiments of the tracker utility will allow tasks to be tied to specific transactions or events, as well as groups of events of classes of events. As such, a manager or supervisor can tie tasks to specific transactions or, in some embodiments, the system may dynamically assign tasks to certain transactions based on an automated analysis of the transactions and/or data previously collected with regards to that transaction. The data recorded becomes part of the transaction record and can therefore be included in a report if needed, searched, sorted, etc. When tasks are not tied to specific transactions, data collected is stored in its own table. The table could be exported in a format used by common spreadsheet programs. In some embodiments, the users are required to actuate a button or menu item or otherwise to invoke the tasks but in others, the tasks can be configured to record data automatically without user input.

The task can be associated with almost any combination of module, screen, function, event and user. This association can be accomplished using a variety of techniques, such as filters, sticky bits, flags, etc. Further, a task can also be created with no associations (unfiltered). An unfiltered task will display on all screens that include the tracker functionality. For instance, in embodiment, certain screens may include a tracker soft button that can be actuated to invoke the tracker function.

If any particular screen, data entry, event, etc. includes the tracker utility, in some embodiments users can collect data at any time simply by invoking the tracker utility. This can be accomplished in a variety of techniques including drop down menus, key sequences, actuating a soft button, etc. In an exemplary embodiment, invoking the tracker utility causes the tracker user screen dialog to be displayed. From the tracker user screen dialog, the user can then create a task that is specifically associated with that user. Thus, other users would not see or have access to the task even though they may be accessing the same screen. However, managers or supervisors would typically have access and receive notifications of the creation of such user-initiated tasks and have access to the controlling the task, modifying the task, reviewing data collected, assigning the task to other users, etc. Such actions could be accomplished by giving authorized persons access to the task manager screen.

Embodiments of the tracker utility may allow authorized users to create, assign and manage tasks. Tasks would be available for assignment throughout the system as described above. Managers would also be able to view user-initiated tracker entries and modify/delete them as needed. In a particular embodiment, the display would essentially be a series of tables. One table might display user-level data items. Another table might display a list of existing data items. Highlighting one of the items in a table would cause its details (including collected data) to display in another table.

U.S. patent application Ser. No. 13/560,528, incorporated above by reference, presents details of a web-centric accounting and general ledger system. Such a system may include an embedded tracker utility. In such an environment, the tracker utility may be available and associated with various screens, data records, etc., within the accounting and general ledger system. A non-limiting example of the application of the tracker utility within this environment would include performing or setting a data collection to occur on the event of entering a foreign currency deposit into the system. Upon the occurrence of such an event, the user or system may access a system to obtain the current exchange rate for that currency and enter that data into the system. As another example, a tracking task can be set up to analyze payments received for accounts receivable. A company may want to determine if there is any correlation between the date that their customers submit payments for outstanding receivables. In such an application, the company may try to identify data samples that could be collected that may provide such an indication. For instance, if a customer submits payment ranging from 30 days after invoicing to 60 days after invoicing, the company may want to see if a correlation can be identified and if so, attempt to identify a remedy for the situation. For example, suppose the customer was very reliant upon timely shipments of their products. The company, among other things, obtained data samples for the number of FEDEX and UPS trucks that would hub through the city headquarters on a daily basis. The data indicated that while the number of trucks remained somewhat constant, the weight of the loads varied greatly. Further, the load weights seemed to have a correlation with the payment schedule for the customer. Understanding that the delivery trucks has a maximum load weight that they could haul, it was apparent that the periodically occurring increased load weights were resulting in delayed deliveries of the customer' inventory. Armed with this information, the company was able to determine that another of their customers had an increased level in orders from the company and those increases tended to coincide with the increased load weights of the trucks. The company then was able to conclude, and verify with further collection of data that when the second customer had an increase in orders, that this would result in a delay of payment from the first customer in about a one month period of time. They were able to convey this information to their customer so that the customer could plan ahead with regards to upcoming shipments. Thus, in this example it is shown not only how the collection of data can help to identify cause and effects on certain events but also how information within a companies system can be cross-correlated to help to further facilitate such analysis.

Figure 12:
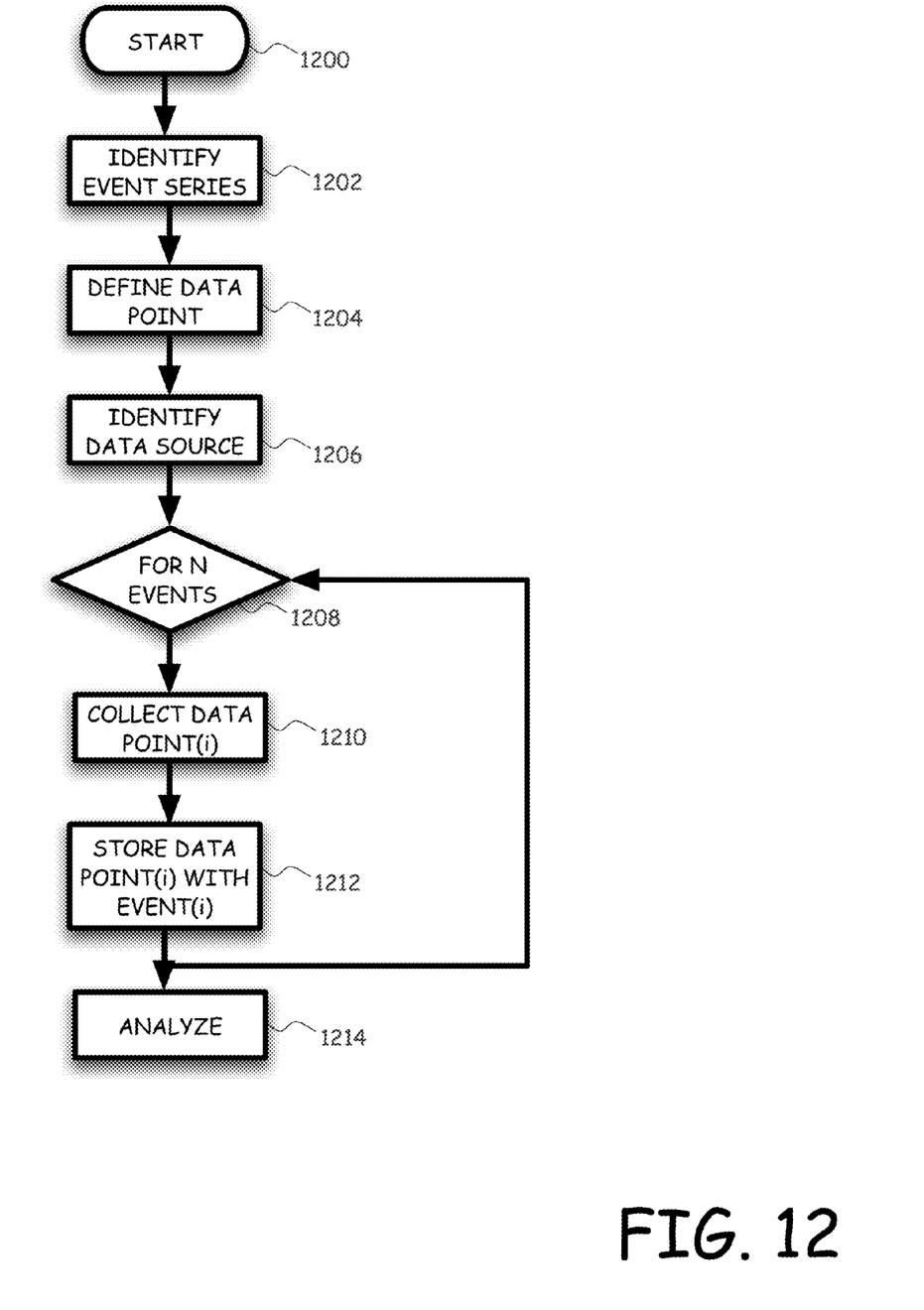
FIG. 12 is a flow diagram illustrating actions that may occur in an exemplary embodiment of the tracker utility.

FIG. 12 is a flow diagram illustrating actions that may occur in an exemplary embodiment of the tracker utility. The tracker utility 1200 is included with or operates in conjunction with an application or system that may collect information about or otherwise monitor a series of events, actions or data (collectively referred to as events). In utilizing the tracker, a series of events is identified 1202 for which it is desired to determine or find a causal relationship for certain characteristics of one or more of the events. For instance, if one or more of the events differentiates from expected outcomes, then the data can be collected in an attempt to find the reason that these events deviate from the norm or expected results. Next, the data to be collected for this determination is defined 1204. Data or information can be identified that hypothetically could have an effect on the events. The format and type of data is thus defined such that the data can be reliably collected and entered into the system. Next one or more sources for the data is identified 1206. The source can be a remote source accessible through a network, a local source or a variety of sources that are either directly or indirectly accessed. Once the series of events, data points and sources are identified, for at least a portion of the events 1208, data points are collected 1210 and then stored along with event information 1212. The portion of the events may be selected based on a schedule, based on parametric values such as users associated with the events, time of day, day of week, etc., as well as other factors. Once data has been collected, the data can be analyzed 1214 to determine if there is a causal effect shown between the data and the event deviations.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is claimed is:

1. A processor implemented method of enabling the collection of a series of data points in conjunction with a series of events such that the series of data points can be analyzed to identify a correlation measure between the series of data points and the series of events, the processor operating in response to executing program instructions, the method comprising the acts of:
   identifying an event that is part of a first series of events;
   defining a data point to collect for the first series of events;
   requesting, from a first set of data sources, the defined data point for the identified event;
   receiving, from any subset of the first set of data sources, the defined data point for the identified event;
   enabling one or more data sources of the first set of data sources to define a different data point for the identified event; and
   receiving, from the one or more data sources of the first set of data sources, a source defined data point for the identified event;
   whereby, for a plurality of events in the series of events, the defined data points, the source defined data points and the events can be analyzed to identify a correlation measure.

2. The method of claim 1, wherein the processor identifies the plurality of events of the first series of events by applying a filter to the first series of events.

3. The method of claim 1, further comprising the act of defining a schedule for the collection of the defined data points.

4. The method of claim 3, wherein the schedule identifies collection times around the event.

5. The method of claim 1, further comprising the acts of:
   identifying an event that is part of a second series of events;
   defining a data point to collect for the second series of events, the defined data point for the second series of events similarly defined as the source defined data point of the first series of events;
   requesting, from a second set of data sources, the defined data point for the identified event;
   wherein the second set of data sources comprises more data sources than the first set of data sources.

6. The method of claim 1, wherein the second series of events comprises more events than the first series of events.

7. A system for identifying a correlation measure between a series of data points associated with a series of events, the system comprising:
   a memory element configured to store data;
   a source interface to one or more data sources, the data sources configured to provide data related to an event and to provide data points not defined or requested by the processor;
   a user interface; and
   a processor communicatively coupled to the memory element, the source interface and the user interface, the processor configured to collate data from the data sources interface via a data request, the processor, in response to executing program instructions contained in the memory element, being configured to:
   identify an event that is part of a first series of events;
   define a data point to collect for the first series of events;
   request, from a first set of data sources, the defined data point for the identified event;
   receive, from any subset of the first set of data sources, the defined data point for the identified event;
   receive, from any subset of the first set of data sources, a source defined data point for the identified event; and
   for a plurality of events in the first series of events, analyze the defined data points, the source defined data points and the events for a correlation measure.

8. The system of claim 7, wherein the processor is additionally configured to identify the plurality of events of the first series of events by applying a filter to the first series of events.

9. The system of claim 7, wherein the processor is additionally configured to define a schedule for the collection of the defined data points.

10. The system of claim 9, wherein the schedule identifies collection times around the event.

11. The system of claim 7, wherein the processor is additionally configured to:
   identify an event that is part of a second series of events;
   define a data point to collect for the second series of events, the defined data point for the second series of events similarly defined as the source defined data point of the first series of events;
   request, from a second set of data sources, the defined data point for the identified event; and
   wherein the second set of data sources comprises more data sources than the first set of data sources.

12. The system of claim 7, wherein the second series of events comprises more events than the first series of events.

13. A processor implemented method of enabling the collection of a series of data points in conjunction with a series of events such that the series of data points can be analyzed to identify a correlation measure between the series of data points and the series of events, the processor operating in response to executing program instructions, the method comprising the acts of:
   identifying an event that is part of a first series of events;
   defining a first data point to collect for the first series of events;
   requesting, from a first set of data sources, the defined data point for the identified event;
   receiving, from any subset of the first set of data sources, the defined data point for the identified event;
   receiving, from at least one data source of the first set of data sources, a source defined data point for the identified event;

defining a second data point to collect for the first series of events, the second defined data point similarly defined as the source defined data point; and requesting, from a second set of data sources, the second defined data point for the identified event;

whereby, for a plurality of events in the first series of events, the first defined data points, the second defined data points and the events can be analyzed to identify a correlation measure.

14. The method of claim 13, wherein the processor identifies the plurality of events of the first series of events by applying a filter to the first series of events.

15. The method of claim 13, further comprising the act of defining a schedule for the collection of the defined data points.

16. The method of claim 15, wherein the schedule identifies collection times around the event.

17. The method of claim 13, further comprising the act of:
identifying an event that is part of a second series of events;
defining a data point to collect for the second series of events, the defined data point for the second series of events similarly defined as the source defined data point of the first series of events;
requesting, from a third set of data sources, the defined data point for the identified event; and
wherein the third set of data sources comprises more data sources than the first set of data sources.

18. The system of claim 13, wherein the second series of events comprises more events than the first series of events.

* * * * *

UNITED STATES PATENT AND TRADEMARK OFFICE
CERTIFICATE OF CORRECTION

| | | |
|---|---|---|
| PATENT NO. | : 9,202,174 B2 | Page 1 of 1 |
| APPLICATION NO. | : 13/751320 | |
| DATED | : December 1, 2015 | |
| INVENTOR(S) | : Daniel A Dooley | |

It is certified that error appears in the above-identified patent and that said Letters Patent is hereby corrected as shown below:

On the title page insert item (60), Related U.S. Application Data
    --Continuation in part of application No. 13/560,528, filed on July 27, 2012.--.

Signed and Sealed this
Twenty-ninth Day of March, 2016

Michelle K. Lee
*Director of the United States Patent and Trademark Office*